United States Patent [19]
Fleagle

[11] 3,842,355
[45] Oct. 15, 1974

[54] SIGNAL PROCESSING CIRCUIT FOR WHEEL SLIP CONTROL SYSTEMS

[75] Inventor: Joseph E. Fleagle, Overland, Mo.

[73] Assignee: Wagner Electric Corporation, Parsippany, N.J.

[22] Filed: Mar. 13, 1973

[21] Appl. No.: 340,735

Related U.S. Application Data

[62] Division of Ser. No. 218,378, Jan. 17, 1972.

[52] U.S. Cl.............. 328/114, 307/235 R, 328/117, 328/132, 328/147
[51] Int. Cl. ........................................... H03k 5/18
[58] Field of Search......... 307/235 R; 328/114, 117, 328/132, 146, 147

[56] References Cited
UNITED STATES PATENTS

| | | | |
|---|---|---|---|
| 3,437,833 | 4/1969 | Razaitis et al. ................. | 328/114 X |
| 3,715,738 | 2/1973 | Kleist et al...................... | 328/114 X |

Primary Examiner—John Zazworsky
Attorney, Agent, or Firm—Eyre, Mann & Lucas

[57] ABSTRACT

A signal processing circuit for use in skid control systems to vary the pressure applied to fluid controlled brake actuating mechanisms upon detection of a predetermined threshold of wheel deceleration, and upon detection of a subsequent, predetermined decrease in wheel rotational velocity. A signal proportional to the velocity of a selected wheel is received and process to develop a signal proportional to the rate of change of velocity of the selected wheel, and these signals are employed to control the sequence and duration of the energization and de-energization of solenoid valves in a modulator valve assembly. The incremental decrease in wheel velocity from the time said deceleration threshold is reached, at which time a first solenoid valve is energized to effect a gradual reduction in brake line fluid pressure, is monitored to determine when a variable reference increment of wheel speed $\Delta v$ has been exceeded, at which time a second solenoid valve is energized to effect a sharp reduction in brake line fluid pressure. The variable reference increment of wheel speed $\Delta v$ is defined by the value of wheel velocity at the time said deceleration threshold is reached and by a variable reference signal which is directly related to the rate of change of wheel speed. The magnitude of $\Delta v$ is inversely related to the magnitude of the variable reference signal, thereby shortening the period of time between the gradual and sharp reductions in brake line fluid pressure when velocity decreases very rapidly upon the application of braking force.

10 Claims, 2 Drawing Figures

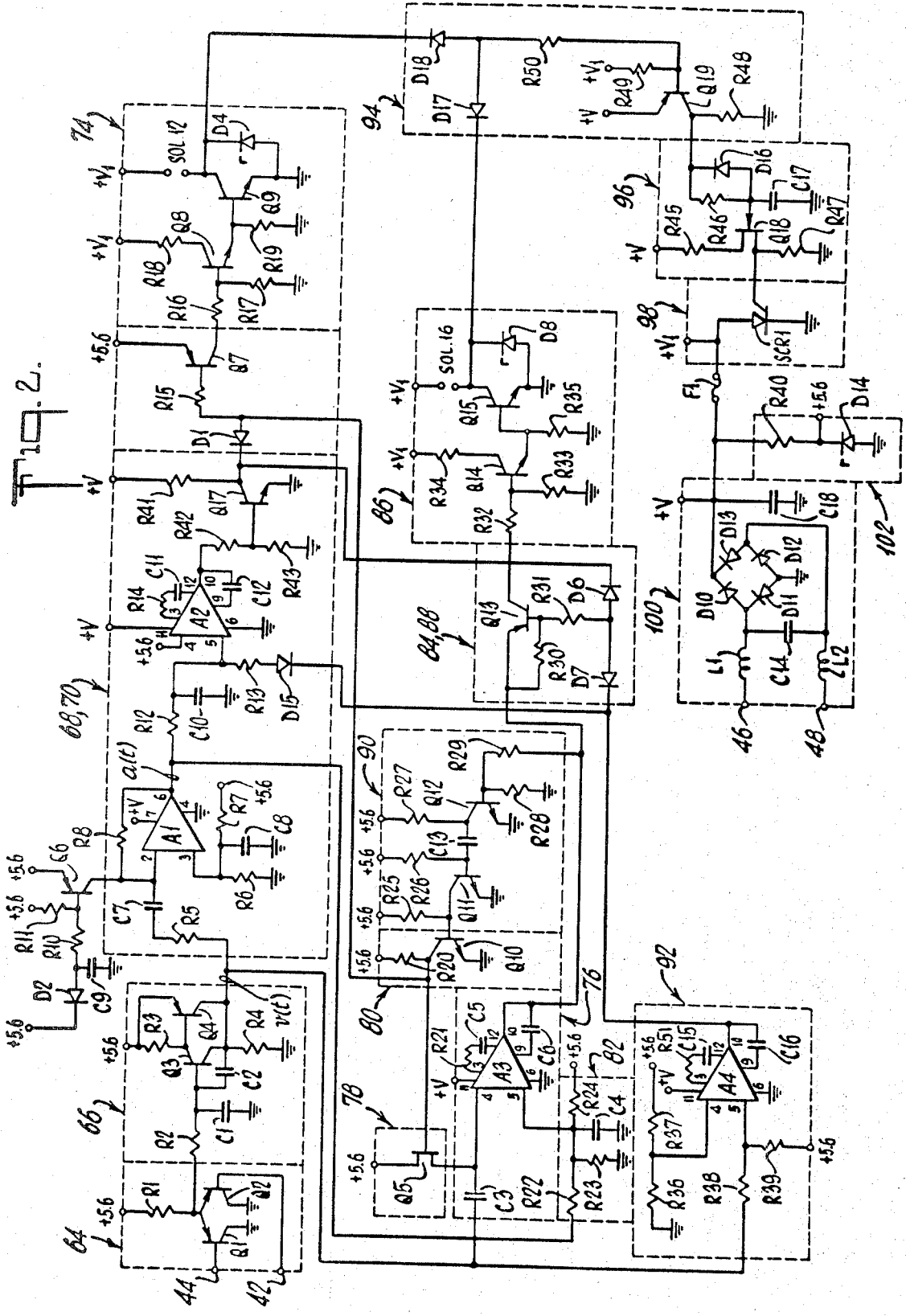

SIGNAL PROCESSING CIRCUIT FOR WHEEL SLIP CONTROL SYSTEMS

This application is a division of application Ser. No. 218,378 entitled WHEEL SLIP CONTROL SYSTEM FOR AUTOMOTIVE VEHICLES AND THE LIKE filed on Jan. 17, 1972 in the name of Joseph E. Fleagle.

CROSS REFERENCE TO RELATED APPLICATION

The system disclosed herein advantageously incorporates the modulator valve assembly disclosed and claimed in application Ser. No. 218,293 entitled BRAKE ANTI-LOCK MECHANISM filed on even date herewith in the name of John A. Machek.

BACKGROUND OF THE INVENTION

The purpose of the present invention may best be understood with the aid of a brief explanation of the problem which is sought to be overcome. A vehicle's braking system is capable of effecting three different relationships of wheel rotation speed, i.e., the angular velocity of the wheel, to vehicle linear speed. These relationships are: (1) wheel rotation speed synchronized to vehicle linear speed (0 percent wheel slip), i.e., no relative motion between road surface and the portion of the wheel-mounted tire which is in contact with the road surface; (2) wheel rotation speed below synchronization with vehicle linear speed, a condition commonly referred to as wheel slip and quantified by the formula $$\frac{\text{Synchronous Wheel Speed} - \text{Actual Wheel Speed}}{\text{Synchronous Wheel Speed}} \times 100 = \text{Percent Wheel Slip}$$

and (3) wheel not rotating while vehicle is in motion, a condition commonly referred to as wheel skid (100 percent wheel slip). Any driver, by pressing on the brake pedal, can easily produce the first and last of these relationships. It is the second relationship, the wheel rotating below synchronization speed, that is very difficult to obtain even by a very experienced test driver. Road friction variations, vehicle loading and brake sensitivity an stability are several of the major reasons why this state is so difficult to obtain. Therefore, most drivers brake in such a manner that the vehicle wheels are either synchronized to vehicle speed or completely locked. Both of these situations may result in a straight-line stop, but there are exceptions. Generally, braked wheels that are synchronously rotating throughout the entire stop will give straight-line stops. Theoretically, locked wheels should also give straight-line stops, but frequently do not in actual practice because brakes do not always lock up at the same time. The small initial angular impulse resulting from non-simultaneous lock-up starts the vehicle rotating as it slides. As the center of gravity shifts further and further off center, inertial forces continue to rotate the vehicle. A rotational deviation of approximately 20° between the vehicle center line and vehicle direction vector makes it almost impossible to regain control. Therefore, maximum controllability can only be achieved with rolling wheels.

It has long been known that a rubber tire has maximum tractive force or "grip" on the road when it is pushed beyond the state of simple static traction, but not so far as to lose all its "gearing" with the road surface. This range of maximum traction occurs when the tire angular speed is below the corresponding linear speed of the vehicle, i.e., when there is some degree of wheel slip. As was pointed out earlier, wheel slip is the most difficult condition to attain. Recent information has also pointed out that impending skid stops on high friction surfaces do not shorten the stopping distance as much as on a low friction surface. On most surfaces, however, it has been found that maximum tactive forces occur when the tire angular speed is at least 10 percent lower than the angular speed at which the tire would be in synchronization with the linear vehicle speed. Therefore, on any given road surface, the shortest stop possible can only be made if this condition is achieved. The purpose of the present invention is to achieve this condition by varying the brake line pressure when the angular deceleration of a braked wheel reaches a predetermined minimum value.

Various prior art patents disclose signal processing circuits in skid control systems having the same goal. In particular, U.S. Pat. No. 3,566,610 issued on Jan. 19, 1971 to Teldix GMBH upon an application filed in the name of Heinz Leiber generally discloses brake control systems for preventing wheel locking. The electronic embodiments disclosed by this patent are, however, capable of reducing brake line pressure only in response to a fixed incremental decrease in wheel speed. Such embodiments do not adjust the reference signal representative of this predetermined incremental decrease in wheel speed.

SUMMARY OF THE INVENTION

The present invention is embodied in and carried out by an adaptive processing circuit for wheel slip control systems, said systems being operative to vary brake line pressure to achieve a desirable percentage of wheel-slip under widely varying conditions of vehicle load weight distribution and varying tire-road interface conditions. The high degree of adaptivity of applicants' signal processing circuit for wheel-slip control systems derives from applicants' novel utilization of signals proportional to wheel velocity and rate of change of wheel velocity to determine when brake line pressure is to be reduced. More specifically, the decrease of the velocity of a selected wheel from the time a predetermined deceleration threshold has been exceeded by that wheel is monitored to determine if a variable reference increment $\Delta v$ has been exceeded, at which time a sharp reduction in brake line fluid pressure is effected. The variable reference increment of wheel speed $\Delta v$ is defined by the value of wheel speed at the time said deceleration threshold is exceeded and a reference signal which varies continuously and in direct relationship to the rate of change of wheel speed.

BRIEF DESCRIPTION OF THE DRAWINGS

The present invention may be better understood by reading the written description thereof with reference to the accompanying drawings, of which:

FIG. 2 is a schematic wiring diagram of the signal processing circuitry illustrated generally in FIG. 2.

Figure 1:
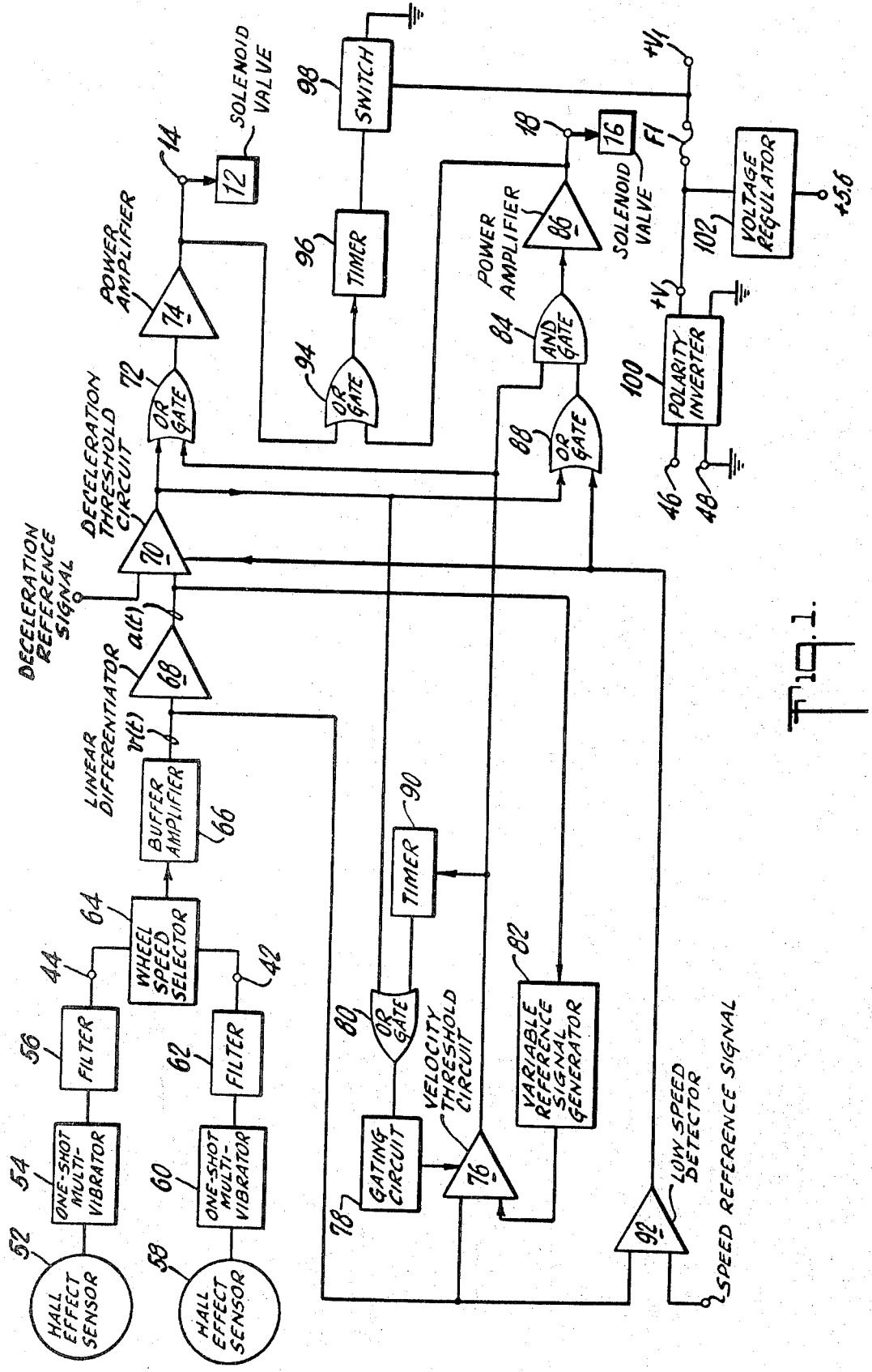
FIG. 1 is a block diagram of the preferred embodiment of the electronic control circuit which generates and processes the wheel speed signals and actuates the solenoid valves which form part of a complete system.

Referring specifically to the logic diagram shown in FIG. 1, first and second wheel spaced signals are generated, the first by hall-effect sensor 52 connected to a first wheel so as to generate a continuous train of pulses varying in frequency in direct proportion of wheel speed. This pulse train is fed into a one-shot multivibrator 54 which in turn generates a variable-frequency train of pulses of constant amplitude and width. This train of standardized pulses is converted to a first wheel speed analog signal by circuit by filter 56. In like manner, a second wheel speed analog signal is generated by hall-effect sensor 58, one-shot multivibrator 60, and filter circuit 62. These wheel speed analog signals may be generated by various other means which are known or may become known in the art. Each of these wheel speed analog signals is fed into wheel speed selector circuit 64 which operates to select the signal representative of the lowest wheel speed for transmission to buffer amplifier 66. Although different selection criteria may be applied, this approach has been found to afford optimum results, particularly in terms of vehicle stability. Thus, a signal $v(t)$ which is proportional to the speed of the slowest-rotating wheel is provided at the output of buffer amplifier 66. This signal is fed to differentiating circuit 68, which in turn generates a signal $a(t)$ proportional to the rate of change of the wheel speed signal $v(t)$. The rate-of-change signal $a(t)$ forms the variable input to deceleration threshold circuit 70, which compares $a(t)$ to a deceleration reference signal which represents a predetermined value of wheel deceleration (preferably $-1$ g). When the rate-of change signal $a(t)$ exceeds the reference signal, a variable-width pulse is generated by threshold circuit 70. This pulse is fed to one input channel of OR gate 72, which in turn generates a first solenoid-controlling output pulse which is amplified by power amplifier 74 to actuate the solenoid valve 12, thereby causing brake line fluid pressure to be slowly decreased.

Meanwhile, the wheel speed analog signal $v(t)$ is continuously fed into velocity threshold circuit 76 which is inoperative to perform any comparison function until actuated by gating circuit 78. The output pulse of deceleration threshold circuit 70 constitutes an input to OR gate 80, the resulting output of which actuates gating circuit 78, thus causing velocity threshold circuit 76 to begin monitoring the decrease in $v(t)$ from the initial value $V_1$ of $v(t)$ at the time gating circuit 78 is actuated. Thus, the initial value $V_1$ is representative of the speed of the selected wheel at the time the deceleration threshold of circuit 70 was reached. As $v(t)$ decreases due to the application of braking force to the wheel, velocity threshold circuit 76 compares the difference between the initial value $V_1$ and the wheel speed analog signal $v(t)$ with a variable reference increment of wheel velocity $\Delta v$. This increment $\Delta v$ is defined by the difference between the stored value $V_1$, which is fixed in any given cycle but varies from cycle to cycle, and the instantaneous value of the output of reference signal generator 82, which increases or decreases as the rate-of-change signal $a(t)$ increases or decreases, respectively. The net effect is to provide a continuously-varying reference increment of wheel velocity $\Delta v$ which is inversely related to the rate-of-change signal $a(t)$. Thus, the more rapidly the monitored wheel decelerates upon initial braking, the sooner voltage comparator 76 will produce an output pulse which will be fed to AND gate 84. The second input signal required to cause AND gate 84 to generate an output pulse has already been provided by OR gate 88 in response to the output pulse of deceleration circuit 70. Thus, a second solenoid-controlling output pulse is generated by AND gate 84 and amplified by power amplifier 86, the output of which energizes solenoid valve 16.

At this point in the operating cycle, both solenoid valves 12 and 16 have been energized, and brake line fluid pressure has been relieved, first gradually, then sharply. The rate-of-change signal $a(t)$ consequently decreases from its threshold-exceeding value, thereby terminating the output pulse of deceleration threshold circuit 70. As a result, the solenoid-controlling output of power amplifier 86 is also terminated, since the absence of any input to OR gate 88 results in the absence of one necessary input to AND gate 84. This assumes the normal absence of an output pulse from low speed detector 92, the function of which will be explained further on.

The solenoid-controlling output of power amplifier 74 is maintained beyond the termination of the output of power amplifier 86 by application of the output pulse of velocity threshold circuit 76 to an input of OR gate 72. Thus, first solenoid valve 12 remains energized, and brake line fluid pressure is again slowly reduced. As the selected wheel speed increases, the output pulse of velocity threshold circuit 76 will terminate when wheel speed analog signal $v(t)$ reaches a value at which the difference between it and the initial value $V_1$ is less than the now-increasing reference increment $\Delta v$ resulting from the decreasing output of variable reference signal generator 82. As pointed out earlier the magnitude of this reference increment $\Delta v$ is inversely related to the magnitude of the rate-of-change signal $a(t)$. Upon termination of the output pulse of velocity threshold circuit 76, the solenoid-controlling output pulse of OR gate 72 is terminated, resulting in de-energization of the first solenoid valve 12. This completes one full cycle of the signal processing circuit. As this cycle is repeated, decreasing initial values $V_2$, $V_3$, ... $V_n$ of the decreasing wheel speed analog signal $v(t)$ are employed in combination with the continuously-varying output of reference signal generator 82 to define $\Delta v$ within each cycle.

The timer 90 is actuated by the initiation of the output pulse of velocity threshold circuit 76. For a predetermined period of time measured from such actuation, preferably about 1.0 second, timing circuit 90 provides an input to OR gate 80 so that gating circuit 78 will remain actuated after termination of the output pulse from deceleration threshold circuit 70, in the event the termination of that output pulse occurs before the output of timer 90 terminates. Thus, comparison of the velocity signal $v(t)$ with the initial value $V_1$ of that signal can continue after the deceleration of the selected wheel falls below the reference threshold of circuit 70. The output pulse of velocity threshold circuit 76 can be terminated by either (1) wheel spin-up beyond the threshold value determined by reference signal generator 82 and initial wheel speed value $V_1$, or (2) termination of the output of timer 90.

Under certain conditions, e.g., on a low-friction surface at low speed, brake fluid line pressure may not be relieved fast enough to prevent a brief wheel lock. This has the undesirable effect of terminating the output pulse of deceleration threshold circuit 70 before brake fluid line pressure has been sufficiently decreased. To overcome this problem, the signal processing circuit includes means for generating an output during those periods of time when the speed of the selected wheel is below a certain value, and employing this output in place of the output which would normally be generated by deceleration threshold circuit 70. Specifically, the low speed detector 92 is operative to generate such an output whenever the speed of the selected wheel drops below a predetermined threshold, preferably about 5 mph. This output is applied to OR gate 88, which in turn provides one of the necessary inputs to AND gate 84. So long as velocity threshold circuit 76 concurrently provides the other necessary input, AND gate 84 will provide an output pulse and the second solenoid valve connected to terminal 18 will be energized. The output of low speed detector 92 is also applied to deceleration threshold circuit 70 so as to prevent generation of an output pulse when synchronous wheel speed is below the predetermined threshold value. The purpose of this feature is to prevent circuit noise, such as that present in the wheel speed signal $v(t)$ at these low speeds, from causing deceleration threshold circuit 70 from generating a spurious output pulse. When synchronous wheel speed is below the predetermined low value of wheel speed represented by the speed reference signal fed into low speed detector 92, the velocity threshold circuit 76 cannot generate an output pulse due to absence of an input to OR gate 80 which controls gating circuit 78. Consequently, one of the necessary inputs to AND gate 84 is absent, preventing energization of the second solenoid valve 16. Since deceleration threshold circuit 70 has been disabled from producing an output pulse, OR gate 72 has no input signal at either terminal, preventing energization of the first solenoid valve 12. Thus, the system is preventing from varying brake line fluid pressure when synchronous wheel speed is below a predetermined low value.

A fail-safe circuit is formed by OR gate 94, timer 96, switch 98 and fuse F1. Whenever an output is produced by either of the power amplifiers 74 and 86, OR gate 94 provides a triggering signal to timer 96. If the triggering signal from OR gate 94 has a longer duration than the inherent delay of the timer 96, switch 98 is actuated to provide a short circuit from the +V supply terminal to circuit ground. Consequently, fuse F1 will be blown by the large current passing therethrough, thereby removing supply voltage from the power amplifiers 74 and 86. Thus, the wheel slip control system is disabled. If the duration of the output of OR gate 94 is shorter than the inherent delay of timer 96 (preferably about 2 seconds), the timer is reset upon termination of its input.

The power supply comprises polarity inverter 100, which provides an output voltage of predetermined polarity regardless of the manner of connection of the source of DC power between power input terminals 46 and 48. This feature allows the control circuit to be employed in either positive-ground or negative-ground vehicles.

A portion of the power output of polarity inverter 100 is fed to voltage regulator 102, which provides a regulated +5.6 VDC output to specific portions of the control circuit, as shown in detail in FIG. 2.

Referring now specifically to the schematic wiring diagram of FIG. 2, the voltage selector 64 is formed by transistors Q1 and Q2 and resistance R1. The unity-gain buffer amplifier 66 is formed by transistors Q3 and Q4, resistances R2, R3 and R4, and capacitances C1 and C2. The voltage derived at the collector of transistor Q4 has an amplitude directly proportional to wheel speed. This output voltage varies between 0 and 4 volts DC over a range of wheel speeds corresponding to a vehicle speed range from 0 to 80 miles per hour.

The integrated circuit A1, resistances R5, R6, R7 and R8 and capacitances C7 and C8 form the linear differentiator 68, which receives the selected wheel velocity analog signal $v(t)$ and produces the wheel velocity rate-of-change signal $a(t)$. The transfer function of the linear differentiator 68 is $$a(t)/v(t) = S \cdot R8 \cdot C7/(S \cdot R5 \cdot C7)+1$$

As is apparent from the foregoing formula, linear differentiator 68 has a transmission zero at $f = 0$ and an output which increases at the rate of 20 db per decade of frequency. Thus, as frequency increases, the term $S \cdot R5 \cdot C7$ becomes significant and the gain levels off. The no-signal (zero rate-of-change) output voltage is established by the voltage divider formed by resistances R6 and R7. The output voltage at pin 6 of integrated circuit A1 will be the same as the voltage at pin 3, except for small errors caused by the off-set voltage between pins 2 and 3 and the small bias current drawn at pin 2. The components of the linear differentiator 68 have been chosen so as to make these errors negligible.

The circuit formed by transistor Q6, diode D2, resistances R10 and R11, and capacitances C9 is designed to establish the proper initial conditions upon power turn-on, and to minimize the time required for the linear differentiator 68 to reach the steady state. When power is first applied, transistor Q6 is biased on and clamps pin 2 of integrated circuit A1 at +5.6 volts DC. After approximately 0.1 second, capacitance C9 charges sufficiently through R10 to turn off transistor Q6, which enables the linear differentiator circuit 68 to operate in a steady state condition. Diode D2 provides a rapid discharge path for capacitance C9 when power is removed.

The rate-of-change signal $a(t)$ is coupled through the filter formed by resistance R12 and capacitance C10 to integrated circuit A2, which along with resistance R14 and capacitance C11 and C12 form the deceleration threshold circuit 70. Integrated circuit A2 is an operational amplifier connected to operate as a comparator. Whenever the voltage at pin 5 of A2 becomes greater than the +5.6 volts DC applied to pin 4, pin 10 switches from a low-voltage to a high-voltage state. A threshold voltage representative of a $-1g$ deceleration is established by resistances R6 an R7 connected to pin 3 of integrated circuit A1. Fewer parts are thus required than if the threshold circuit were coupled directly to A2. The output of the linear differentiator 68 increases at the rate of 0.4 volts per $g$ of deceleration. Consequently, the values of R6 and R7 have been chosen to provide an output of +5.2 volts DC at pin 6 of A1 under no-signal conditions. The threshold value of deceleration may be changed by altering the values of resistances R6 and R7, the ratio of which determines the threshold of integrated circuit A2. Variations in the +5.6 volts DC supply are attenuated by a factor of R7/R6 + R7. Thus, a precisely regulated supply voltage is not required to maintain a reasonably accurate threshold; simple zener diode regulation, as provided in this embodiment, is sufficient.

When the integrated circuit A2 of deceleration threshold circuit 70 produces a positive output pulse, the polarity of this pulse is inverted upon being fed through the voltage divider formed by R42 and R43 to the base of transistor Q17 connected to the junction of said voltage divider resistances. Consequently, the normally-high collector of transistor Q17 drops to near circuit ground potential as transistor Q17 is rendered conductive by the output pulse of integrated circuit A2. The cathode of diode D1 is thus similarly placed near circuit ground potential, thereby allowing current to flow from the +5.6 volts DC source across the emitter-base junction of transistor Q7 and through resistance R15, diode D1, and the collector-emitter junction of transistor Q17. This current flow renders transistor Q7 conductive, and current flows from the +5.6 volts DC source across the emitter-collector junction of transistor Q7 through the voltage divider formed by resistances R16 and R17. The positive voltage thus developed at the junction of resistances R16 and R17 is applied to transistor Q8, which is thereby rendered conductive to cause solenoid-controlling transistor Q9 to become conductive. Zener diode D4 is connected between the collector-emitter terminals of transistors Q9 in order to limit the inductive kickback from the solenoid to a sufficiently low value to avoid damage to the power transistor Q9. Corresponding elements in power amplifiers 74 and 86 function in like manner.

The low level at the collector of transistor Q17 is also applied to the cathode of diode D6 in the combined AND and OR gates 84, 88. This constitutes an input to OR gate 88, which in turn provides one of the necessary inputs to AND gate 84. The other necessary input to AND gate 84 will be provided by the velocity threshold circuit 76 in the manner described below.

The gating circuit 78 comprising junction field effect transistor (FET) Q5 is rendered non-conductive by the decrease in voltage at its gate effected by the reduction in voltage at the collector of transistor Q17, to which the gate of FET Q5 is connected through diode D1. Consequently, pin 4 of integrated circuit A3 is no longer held at +5.6 volts DC, and from this point in time wheel velocity analog signal $v(t)$ is fed through capacitance C3 to pin 4. Integrated circuit A3 acts as a comparator of the voltages appearing at pins 4 and 5. Since this circuit is effectively deactuated when FET Q5 is conductive, such comparison is carried out only during the interval in which FET Q5 is non-conductive. The capacitances C5 and C6 and resistance R21 form compensating circuits for A3. Variable reference signal generator 82 comprises capacitance C4 and resistances R22, R23 and R24. A regulated +5.6 volts DC is fed through R24 to the parallel-connected capacitance C4 and resistance R23, while the wheel velocity rate of change analog signal $a(t)$ is fed through resistance R22. The variable voltage thus developed at the high side of capacitance C4 is fed to pin 5 of integrated circuit A3. This variable input voltage at pin 5 of A3 becomes more positive upon deceleration, and less positive upon acceleration of the selected wheel. The more positive pin 5 becomes, the smaller $\Delta v$ (the reference increment of wheel speed) becomes, and the less positive pin 5 becomes, the larger $\Delta v$ becomes. The output of integrated circuit A3 is derived at pin 10, which is normally at a low voltage. When the voltage at pin 4 becomes less positive than pin 5, pin 10 goes from a low voltage to a higher voltage. Pin 10 remains at this higher voltage until the voltage at pin 4 becomes more positive than the continuously-varying reference voltage at pin 5. The variable-width output pulse thus developed at pin 10 of A3 is fed to combined AND and OR gates 84, 88 as the other necessary input to AND gate 84, the first such input being provided by OR gate 88 in response to the variable-width output pulse of deceleration threshold circuit 70 derived at the collector of Q17. Transistor Q13 is thus rendered conductive and passes the output pulse of A3 to power amplifier 86, causing solenoid 16 to be energized.

In the present circuit, the variable voltage output of reference signal generator 82 changes by 50 millivolts (representative of 1 mph) for each $g$ of deceleration or acceleration. The degree of rate compensation can be adjusted by varying the value of resistances R22, R23 and R24. The rate compensation feature is very important in the operation of applicant's signal processing circuit for wheel slip control systems for several reasons. First, the rate at which vehicle wheel velocity departs from synchronous velocity depends on factors such as service air pressure rise rate, road coefficient, load size and distribution, etc. Also, there is an unavoidable delay between the time an electrical signal is provided to the modulator valve assembly and the actual reduction in braking force which results. For all of these reasons, it is virtually impossible to achieve a uniform degree of slip from cycle to cycle. The wheel may lock completely under a first group of conditions, and may not develop enough slip for optimum braking under a second group of conditions. The rate compensation feature enables the system to effectively predict the proper time to relieve pressure in order to develop the optimum wheel slip. Similarly, this feature enables the system to pick the proper time at which to reapply braking force. The result is more uniform operation of the system from cycle to cycle, with the degree of wheel slip achieved in each cycle being much closer to the optimum value than it would be without rate compensation.

In addition, the rate compensation feature overcomes a fundamental problem associated with this type of system. It will be recalled that brake re-application is based on spin-up of the wheel past the initial value $V_1$ of the wheel speed analog signal $v(t)$. However, that information is anywhere from 0.2 to 0.6 second old at the time when braking force is reapplied, and the vehicle velocity may well have decreased substantially during that interval so that the accelerating wheel will never be able to reach the stored value of velocity. This state of affairs is commonplace when braking force is applied while the vehicle is travelling over high-coefficient surfaces where vehicle decelerations are relatively large. However, under these conditions, the wheels accelerate very rapidly upon reduction of braking force. The resulting large acceleration voltage fed to the variable reference signal generator 82 causes the variable reference increment of wheel speed $\Delta v$ to become relatively large, thereby requiring very little wheel spin-up to terminate the variable-width output pulse of the velocity threshold circuit 76.

The timer 90 receives the output pulse appearing at pin 10 of integrated circuit A3 through the resistor R29, and Q12 is consequently rendered conductive. The negative-going pulse appearing at the collector of transistor Q12 is applied through capacitance C13 to the base of transistor Q11, which is thereby rendered non-conductive. Capacitance C13 thus begins recharging through resistance R26. While transistor Q11 remains non-conductive, transistor Q10 of OR gate 80 is rendered conductive since current flowing through resistance R25 is no longer diverted from the base-emitter junction of Q10. As a result, the collector of Q10 goes low, thereby driving the gate of FET Q5 low. Also, the voltage at the junction of R15 and D1 in OR gate 72 is driven low. In this fashion, the output pulse appearing at pin 10 of integrated circuit A3 is indirectly transmitted to OR gate 72. The need for intermediate buffering circuitry between the output of velocity threshold circuit 76 and the input to OR gate 72 is obviated, as a result.

The low speed detector 92 comprises integrated circuit A4 and the compensating circuits formed by resistance R51 and capacitances C15 and C16. The fixed input voltage to pin 4 is derived from the junction of resistances R36 and R37 connected in series between the +5.6 volts DC source and circuit ground. The variable input to pin 5 is derived from the junction of resistances R38 and R39 connected in series between the collector of Q4 in buffer amplifier 66 and the +5.6 volts DC source. The four resistances R36, R37, R38 and R39 provide a quasi-Wheatstone bridge, and the integrated circuit A4 is employed as a differential comparator. Under normal conditions, i.e., when selected wheel speed is above the predetermined threshold, the output of the low speed detector 92 derived at pin 10 of integrated circuit A4 is normally high. However, when the wheel speed analog signal $v(t)$ drops below the threshold value determined by the ratio of resistances R38 and R39, pin 10 of integrated circuit A4 goes low, thereby placing the cathodes of diodes D7 and D15 at a low voltage. As a result, pin 5 of integrated circuit A2 is clamped at approximately +1.6 volts, thereby preventing the rate of change signal $a(t)$ from causing integrated circuit A2 to generate an output pulse. Also, the low voltage at the cathode of diode D7 comprises an input to OR gate 88, which in turn provides one of the necessary inputs to AND gate 84. Consequently, in a situation in which the selected wheel locks up, during an anti-lock cycle, thereby terminating the generation of an output pulse by deceleration threshold circuit 70, brake pressure will nevertheless be sharply relieved as a coincidence of the slip pulse from velocity threshold circuit 76 and the output pulse of OR gate 88 resulting from the input provided by low speed detector 92. At synchronous wheel speeds below 5 miles per hour, it has been found desirable to shut off the threshold circuit 70 to prevent it from generating a spurious output pulse in response to noise present in the sensor signal at these low speeds. When wheel speed is below the predetermined level, integrated circuit A4 has a low-voltage output. With the cathode of diode D15 is placed at this low voltage, pin 5 of integrated circuit A2 is clamped at approximately +1.6 volts DC, thereby preventing the rate-of-change signal $a(t)$ from causing integrated circuit A2 to generate an output.

In the fail-safe circuit, the OR gate 94 detects the energization of either of solenoid valves 12 or 16 by sensing a low voltage at the collector of transistor Q9, which is applied to the cathode of diode D18, or a low voltage at the collector of transistor Q15, which is applied to the cathode of diode D17. In either event, transistor Q19 is rendered conductive to the point of saturation, with the resultant high voltage at its collector being applied to a timer 96. Capacitance C17 charges through resistance R46, and when the voltage across C17 reaches a predetermined value equal to a fixed fraction of the interbase voltage of unijunction transistor Q18, UJT Q18 switches from a non-conductive to a conductive state. A high voltage is thus applied to the gate of silicon controlled rectifier 1, causing it to become conductive and to short-circuit the output of polarity inverter 100 to ground through fuse F1. The sharply-increased current through fuse F1 causes same to blow out, thereby removing supply voltage $V_1$ from the power amplifiers 74 and 86. The various elements of timer 96 are chosen to provide a time delay of approximately 2 seconds from the time either input channel to OR gate 94 detects the energization of a solenoid valve. Obviously, this time delay can be readily varied by adjusting the values of resistance R46 and capacitance C17. The diode D16 across resistance R46 provides a rapid discharge path for C17 when Q19 turns off. This prevents successive cycles of the unit from incrementally increasing the voltage across C17 to the point where the cumulative voltage across C17 is high enough to cause UJT Q18 to fire.

The polarity inverter 100 is of conventional design, and forms no essential part of the invention. The output voltage +V is approximately 1.2 volts less than the +12 volts DC impressed across input terminals 46 and 48 as a result of internal losses. Voltage regulator 102 is likewise of conventional design, comprising current limiting resistance R40 and zener diode D14 in series, the values of which have been selected to provide +5.6 volts DC at the junction thereof.

The values of the various components of the circuit shown in FIG. 3 are as follows:

| Resistances | | Capacitances | |
|---|---|---|---|
| R1 | — 6.8K ohms | C1 | — 1 microfarad |
| R2 | — 15K ohms | C2 | — .047 microfarad |
| R3 | — 15K ohms | C3 | — 1 microfarad |
| R4 | — 470 ohms | C4 | — 1 microfarad |
| R5 | — 4.7K ohms | C5 | — .005 microfarad |
| R6 | — 46.4K ohms | C6 | — 100 picofarads |
| R7 | — 3.48K ohms | C7 | — 1 microfarad |
| R8 | — 392K ohms | C8 | — 5 microfarads |
| R10 | — 33K ohms | C9 | — .47 microfarad |
| R11 | — 100K ohms | C10 | — .47 microfarad |
| R12 | — 15K ohms | C11 | — .005 microfarad |
| R13 | — 470 ohms | C12 | — 100 picofarads |
| R14 | — 1.5K ohms | C13 | — 1 microfarad |
| R15 | — 15K ohms | C14 | — .047 microfarad |
| R16 | — 1K ohms | C15 | — .005 microfarad |
| R17 | — 15K ohms | C16 | — 100 picofarads |
| R18 | — 120 ohms | C17 | — 5 microfarads |
| R19 | — 1K ohms | C18 | — 250 microfarads |
| R20 | — 10K ohms | | |
| R21 | — 1.5K ohms | | |
| R22 | — 15K ohms | Inductances | |
| R23 | — 100K ohms | | |
| R24 | — 2.2K ohms | L1 | — 4 microhenries |
| R25 | — 33K ohms | L2 | — 4 microhenries |
| R26 | — 680K ohms | | |
| R27 | — 4.47K ohms | | |
| R28 | — 3.6K ohms | Transistors | |
| R29 | — 15K ohms | | |
| R30 | — 15K ohms | Q1 | — 2N4250 |
| R31 | — 33K ohms | Q2 | — 2N4250 |
| R32 | — 3.6K ohms | Q3 | — 2N3565 |
| P33 | — 15K ohms | Q4 | — 2N4250 |
| R34 | — 120 ohms | Q5 | — 2N4220 |
| R35 | — 1K ohms | Q6 | — 2N4250 |
| R36 | — 10K ohms | Q7 | — 2N4250 |
| R37 | — 10K ohms | Q8 | — 2N3567 |
| R38 | — 8.45K ohms | Q9 | — 2N3567 |
| R39 | — 10K ohms | Q10 | — 2N3565 |
| R40 | — 68 ohms | Q11 | — 2N3565 |
| R41 | — 10K ohms | Q12 | — 2N3567 |
| R42 | — 22K ohms | Q13 | — 2N4250 |
| R43 | — 4.7K ohms | Q14 | — 2N3567 |

-Continued

| Resistances | | Capacitances | |
|---|---|---|---|
| R45 | — 470 ohms | Q15 | — 2N3567 |
| R46 | — 150K ohms | Q17 | — 2N3567 |
| R47 | — 100 ohms | Q18 | — 2N4871 |
| R48 | — 4.7K ohms | Q19 | — 2N4250 |
| R49 | — 15K ohms | | |
| R50 | — 33K ohms | | |
| Integrated Circuits | | Silicon Controlled Rectifier | |
| A1 | — AD502J | SCR1 | — C106A1 |
| A2 | — MC1709L | | |
| A3 | — MC1709L | | |
| A4 | — MC1709L | | |
| Diodes | | | |
| D1 | — 1N914 | | |
| D2 | — 1N914 | | |
| D4 | — 1N4754 | | |
| D6 | — 1N914 | | |
| D7 | — 1N914 | | |
| D8 | — 1N4754 | | |
| D10 | — 1N4998 | | |
| D11 | — 1N4998 | | |
| D12 | — 1N4998 | | |
| D13 | — 1N4998 | | |
| D14 | — 1N4734A | | |
| D15 | — 1N914 | | |
| D16 | — 1N914 | | |
| D17 | — 1N914 | | |
| D18 | — 1N914 | | |

A number of significant advantages are afforded by a wheel slip control system incorporating the signal processing circuit described herein. Specifically, by means of rate compensation, the system provides a more uniform degree of slip from cycle to cycle for varying road coefficients and load values and distribution. Another important feature is the variation of brake reapplication time, which is determined by wheel velocity, wheel acceleration, and the value of wheel speed at the time skid commenced in each cycle of the system. This advantage is also derived from the rate compensation feature, i.e., the provision of a variable reference signal representative of a varying Δv to the velocity threshold circuit. Also, the system provides a high degree of immunity to noise, i.e., sudden decelerations which do not result in a substantial change in wheel speed. Such decelerations may be caused by bumps in the road, peculiarities of the vehicles' suspension system and flexing of the wheel-mounted tires. Such noise causes only the primary solenoid to be briefly actuated, thereby minimizing the effect on braking force. Larger wheel velocity changes which indicate a true skid cause the secondary solenoid to be actuated and thereby effecting a substantial relief of service air pressure and consequently braking force. Also, air usage is miminized by limiting air exhaust to an amount just sufficient to relieve braking force. As previously explained, the rapid exhaust of service air pressure is terminated as soon as the deceleration of the selected wheel no longer exceeds the predetermined deceleration threshold, and only a slow exhaust of service air pressure is thereafter effected until wheel slip is suitably reduced.

These and other advantages of the present invention, as well as certain changes and modifications of the disclosed embodiment thereof, will be readily apparent to those skilled in the art. For example, simple DC generators could be employed in lieu of the combinations of Hall-effect sensor, one-shot multivibrator, and filter to provide a voltage which is proportional to the speed of each vehicle wheel. In addition, rather than select one of a plurality of wheel speed signals as the input to the electronic control circuitry, a single, selected wheel assembly could be fitted with a single-gnerating means to provide a signal directly to the buffer amplifier of applicant's system, thereby obviating the need for a wheel speed selector. The auxiliary circuit for establishing proper initial conditions for the linear differentiator 68 could be removed. The disclosed embodiment could also be reduced to more basic configurations by elimination of various component circuits. For example, the timer 90 could be removed, with the output of velocity threshold circuit 76 then being fed directly to OR gate 80. Also, low speed detector 92 and OR gate 88 could be eliminated, the output of deceleration threshold circuit 70 then being fed directly as an input to AND gate 84. As a further example, the fail-safe circuitry comprising OR gate 84, timer 96 and swich 98 could be eliminated without rendering the system inoperative. Other modulator valve assemblies having different operational capabilities adapted to particular applications may be employed in combination with the disclosed circuitry in lieu of the cross-referenced device. For example, it may be advantageous to decrease the rate of increase of service air pressure in response to the first output of the circuitry, rather than gradually decrease the service air pressure. Also, it is not necessary that the modulator valve assembly be unitary; it may be formed from various discrete components. It is the applicant's intention to cover all those changes and modifications which could be madde to the embodiment of the invention herein chosen for the purposes of the disclosure without departing from the spirit and scope of the invention.

What is claimed is:

1. A signal-processing circuit comprising:
   1. first circuit means operative to receive an input signal and to generate a signal representative of the first derivative of said input signal, and further operative to generate a first variable-width pulse whenever said signal representative of the first derivative of said input signal exceeds a first reference signal; and
   2. second circuit means operative to receive said input signal, said signal representative of the first derivative of said input signal, and said first variable-width pulse from said first circuit means, and further operative to generate a second variable-width pulse whenever said input signal falls below a second, variable reference signal after initiation of said first variable-width pulse.

2. The circuit according to claim 1 wherein said second, variable reference signal is directly related to said first derivative of said signal representative of the input signal.

3. The circuit according to claim 1 wherein said first circuit means comprises:
   1. differentiator means operative to generate said signal representative of the first derivative of said input signal; and
   2. first threshold circuit means operative to generate said first variable-width pulse whenever the output of said differentiator means exceeds said first reference signal.

4. The circuit according to claim 3 wherein said second circuit means comprises:

1. gating circuit means operative to generate a gating signal in response to at least said first variable-width pulse;
2. second threshold circuit means operative in response to the output of said gating circuit means to compare said input signal to said second, variable reference signal and to generate said second variable-width pulse whenever said input signal falls below said second, variable reference signal; and
3. variable reference signal generator means operative to receive said signal representative of the first derivative of said input signal from said differentiator means and to provide second, variable reference signal to said second threshold circuit means.

5. The circuit according to claim 4 whereiin said gating circuit means is further operative to generate an output in response to said second variable-width pulse.

6. The circuit according to claim 4 wherein said second circuit means further comprises timer means operative in response to said second variable-width pulse to cause said gating circuit means to generate an output for a predetermined period of time after intiation of said second variable-width pulse.

7. The circuit according to claim 1 and further comprising:
1. third circuit means operative to generate a first output in response to either said first or second variable-width pulse; and
2. fourth circuit means operative to generate a second output in response to the coincidence of said first and second variable-width pulses.

8. The circuit according to claim 7 wherein said signal processing circuit further comprises third threshold circuit means operative to compare said input signal to a third reference signal and to generate a third variable-width pulse whenever said input signal falls below said third reference signal, said third variable-width pulse being provided to said first circuit means to disable same from generating said first variable-width pulse.

9. The circuit according to claim 8 wherein said signal processing circuit further comprises logic means operative to receive said first and third variable-width pulses, and further operative in response to either of said pulses to provide an input in lieu of said first variable-width pulse to said fourth circuit means.

10. The circuit according to claim 7 wherein said third circuit means comprises an OR gate, and said fourth circuit means comprises an AND gate.

* * * * *